(12) United States Patent
Ishii (10) Patent No.: US 7,796,564 B2
(45) Date of Patent: Sep. 14, 2010

(54) W-CDMA BASE STATION WITH APPARATUS FOR PROVIDING PACKET DATA COMMUNICATIONS WITH MOBILE UNITS OR TERMINALS

(75) Inventor: Takahito Ishii, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 492 days.

(21) Appl. No.: 11/369,942

(22) Filed: Mar. 8, 2006

(65) Prior Publication Data

US 2006/0221906 A1 Oct. 5, 2006

(30) Foreign Application Priority Data

Mar. 31, 2005 (JP) ............................ 2005-100988

(51) Int. Cl.
*H04B 7/216* (2006.01)
*H04B 7/212* (2006.01)
*H04J 3/00* (2006.01)

(52) U.S. Cl. .................. 370/335; 370/337; 375/147
(58) Field of Classification Search .................. 370/320
See application file for complete search history.

(56) References Cited

U.S. PATENT DOCUMENTS

| | | | | |
|---|---|---|---|---|
| 2003/0033411 | A1* | 2/2003 | Kavoori et al. | 709/226 |
| 2003/0039217 | A1* | 2/2003 | Seo et al. | 370/318 |
| 2003/0112776 | A1 | 6/2003 | Brown et al. | |
| 2003/0123396 | A1* | 7/2003 | Seo et al. | 370/252 |
| 2003/0185159 | A1* | 10/2003 | Seo et al. | 370/278 |
| 2003/0232622 | A1* | 12/2003 | Seo et al. | 455/437 |
| 2004/0085920 | A1* | 5/2004 | Sezgin et al. | 370/320 |
| 2006/0193253 | A1* | 8/2006 | Hamada | 370/229 |

FOREIGN PATENT DOCUMENTS

| | | |
|---|---|---|
| JP | A-2002-374204 | 12/2002 |
| JP | A 2004-166123 | 6/2004 |
| WO | WO 03/052956 A1 | 6/2003 |

OTHER PUBLICATIONS

Mamoru Sawahashi, W-CDMA: Mobile Communications System. 2002. John Wiley & Sons. Ltd. (p. 50, lines 12-14; p. 51, lines 1-8, 19-24.*
Tachikawa Keiji, W-CDMA: Mobile Communications System, 2002, John Wiley & Sons, Ltd.*
Simo Ernest, CDMA Interactive, 1999, www.cdmaonline.com.*
Harri Holma and Antti Toskala, WCDMA for UTMS, Third Edition, 2004, pp. 99-148 and 307-345.*
English-language version of Sep. 8, 2009 Japanese Office Action.

* cited by examiner

*Primary Examiner*—Jayanti K Patel
*Assistant Examiner*—Christopher Crutchfield
(74) *Attorney, Agent, or Firm*—Oliff & Berridge, PLC (57) ABSTRACT

A base station apparatus is disclosed, which can efficiently process a reception signal from a user with a simpler constitution. The base station includes: a packet data user control unit that controls packet data for a user and transmits the packet data and notifies a user ID of a user who transmits data in an arbitrary frame (packet transmission period) and a number of this frame; and a layer control unit that manages the frame number and the user ID and controls de-spread and demodulation. The layer control unit creates finger/user allocation information indicating to which user a finger is allocated and outputs the finger/user allocation information to a demodulation unit. The demodulation unit performs demodulation processing using this information such that generated phase compensation data is connected with an identical user and an identical path.

10 Claims, 9 Drawing Sheets

DATA TRANSMISSION PROCESSING
BY BASE STATION 3
S10

FIG. 9

DATA RECEPTION PROCESSING BY
BASE STATION 3
S20

W-CDMA BASE STATION WITH APPARATUS FOR PROVIDING PACKET DATA COMMUNICATIONS WITH MOBILE UNITS OR TERMINALS

BACKGROUND OF THE INVENTION

1. Field of the Invention

The present invention relates to a base station apparatus of a CDMA mobile communication system and, in particular, to a base station apparatus that has a packet communication function for performing packet communication with a terminal that communicates with a base station.

2. Description of Related Art

This kind of base station transmits packet data for an arbitrary user (terminal; communication node) using a channel exclusively used for packet communication.

In the packet data transmission, an order for transmitting the packet data and user information (an encoding system, a modulation system, the number of codes per user, etc.) concerning the packet data are selected and determined.

For example, JP-A-2004-166123 discloses a method of controlling user information (an encoding system, a modulation system, etc.) for respective users.

A base station acquires quality information such as an SIR (Signal-to-Interference power Ratio) and a BLER (Block Error Rate) in a downlink (a direction from a base station to a terminal) using a channel in an uplink (a direction from a terminal to a base station) and controls an order of transmission to the respective users and the user information using this quality information.

However, when the base station transmits packet data to the terminal, the terminal transmits response data to the base station after a predetermined period elapses. Thus, the base station does not receive a signal from a certain user for some period. This point is not taken into account in JP-A-2004-166123.

Therefore, if hardware (correlators and complex multipliers) for processing a reception signal is fixedly allocated to the respective users, these kinds of hardware are not effectively used in the period in which the base station does not receive signals from the users.

SUMMARY OF THE INVENTION

The invention has been devised in view of the background described above and it is an object of the invention to provide a base station apparatus that can efficiently process a reception signal from a user with a simpler constitution.

In order to attain the object, a base station apparatus according to the invention is a base station apparatus that transmits data to and receives data from a first number of communication nodes at the maximum, transmits data to a second number of the communication nodes in a predetermined period, the second number being smaller than the first number, and detects response data from signals including response data transmitted from the respective second number of communication nodes. The base station apparatus includes: phase fluctuation detecting means that detects phase fluctuations for the response data from the communication nodes, a number of the phase fluctuation detecting mean corresponding to the first number; data detecting means that detects the response data, a number of the data detecting means corresponding to the second number; and phase fluctuation supplying means that supplies the respective phase fluctuations detected to the respective data detecting means. The data detecting means compensates for phase fluctuations in response data from the communication nodes corresponding to the phase fluctuations supplied and detects the response data.

Preferably, the phase fluctuation detecting means includes: first correlation detecting means that detects correlation between code data for uniquely identifying the communication nodes and the signals; and first complex multiplying means that subjects the data detected and a symbol for detecting phase fluctuations to complex multiplication. The data detecting means includes: second correlation detecting means that detects correlation between the code data and the signals; and second complex multiplying means that subjects the detected data and the phase fluctuations to complex multiplication.

Preferably, the phase fluctuation supplying means holds the detected phase fluctuations and supplies the phase fluctuations held to the data detecting means according to the predetermined period and the communication node to which the data is transmitted during this predetermined period.

According to the base station apparatus according to the invention, it is possible to efficiently process a reception signal from a user with a simpler constitution.

BRIEF DESCRIPTION OF THE DRAWINGS

FIGS. 2A and 2B are diagrams showing temporal relation between downlink packet data and uplink packet control data indicating a response to this packet data, wherein FIG. 2A is a case in which packet data is transmitted to one user in a unit time and FIG. 2B is a case in which packet data is transmitted to plural users in a unit time.

DESCRIPTION OF PREFERRED EMBODIMENTS

First Embodiment

A base station apparatus according to a first embodiment of the invention will be explained.

Figure 1:
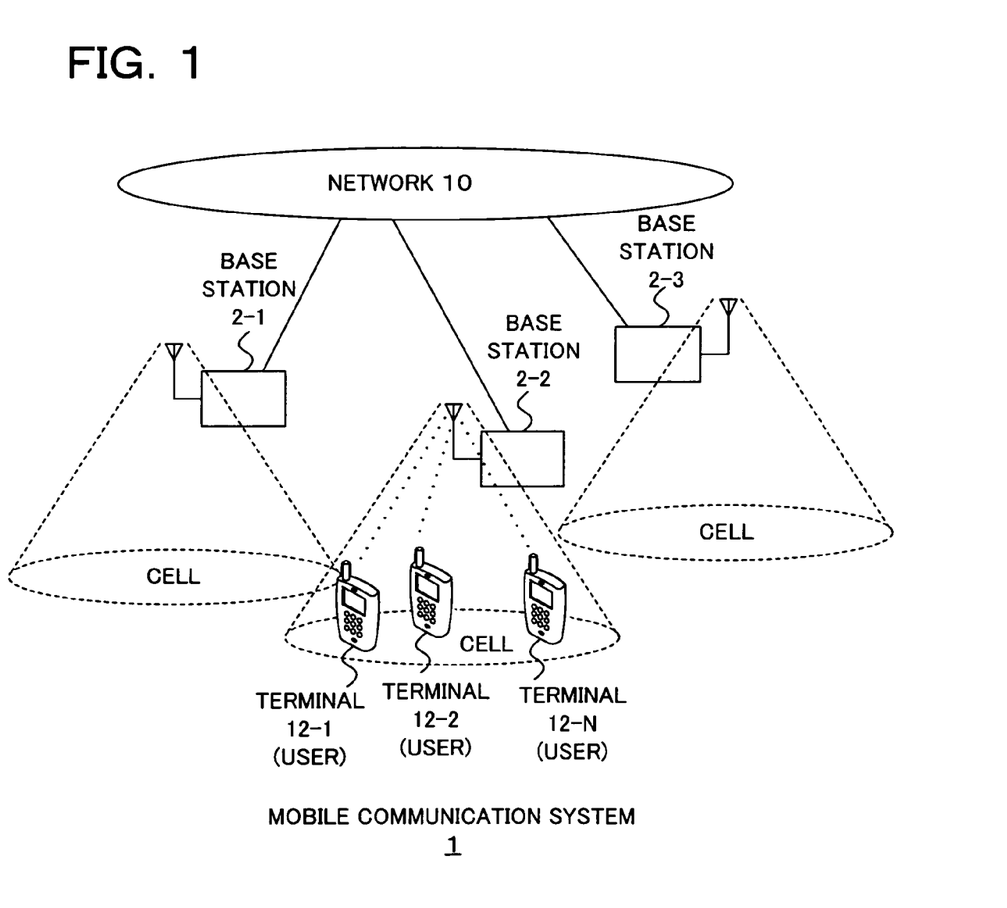
FIG. 1 is a diagram illustrating a mobile communication system 1 of the W-CDMA system.

FIG. 1 is a diagram illustrating a mobile communication system 1 of the W-CDMA system.

As shown in FIG. 1, the mobile communication system 1 includes base stations 2-1 to 2-3 connected via a network 10 and terminals (users: communication nodes) 12-1 to 12-N (N is an integer equal to or larger than 2) that communicate with the base stations.

The number of users covered by one base station is finite with N as a maximum value. The number of users that can communication with the base station in a unit time is finite with M (M<N; M is an integer equal to or larger than 1) as a maximum value.

When any one of plural apparatuses such as the base stations 2-1 to 2-3 is indicated without specifying the same, the apparatus is simply referred to as, for example, the base station 2.

Figure 2:
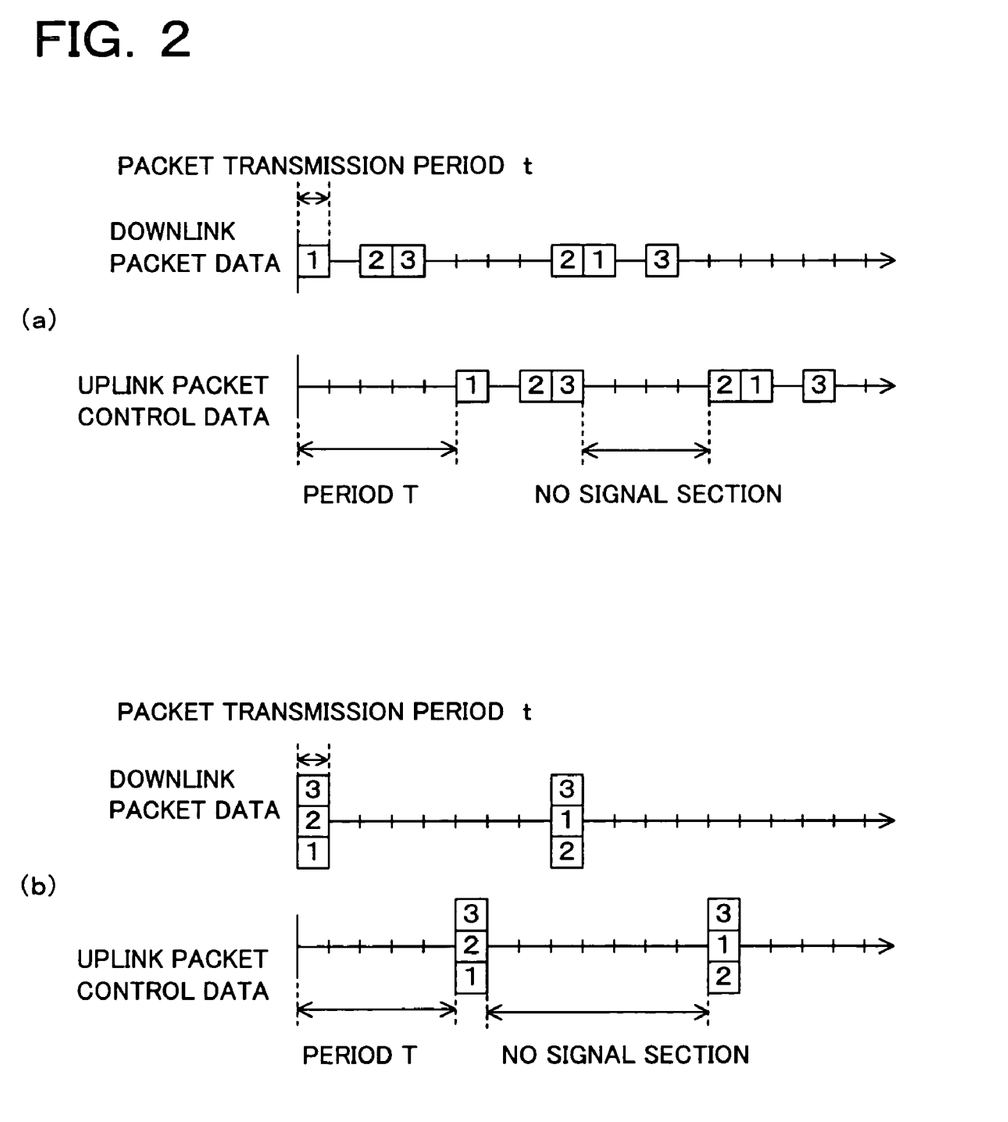

FIGS. 2A and 2B are diagrams showing a temporal relation between downlink packet data and uplink packet control data indicating a response to this packet data. FIG. 2A is a case in which packet data is transmitted to one user in a unit time. FIG. 2B is a case in which packet data is transmitted to plural users in a unit time.

In FIGS. 2(a) and 2(b), a rectangle indicates packet data transmitted and received between the base station 2 and the terminal 12. A number of this packet data indicates a number of a user who receives or transmits the packet data.

As shown in FIG. 2A, when the packet data is transmitted using a channel exclusively used for packet communication, a user and data block are switched with a packet transmission period t [s] (a predetermined time) as a unit period and the data block is transmitted to the user.

In the mobile communication system 1, when packet data is transmitted to a user in a certain packet transmission period, ACK/NACK information (response data) responding to this packet data is transmitted from the terminal 12 to the base station 2 through an uplink packet control channel after a period T [s] determined in advance.

For example, when the terminal 12 normally receives the packet data, the terminal 12 transmits ACK to the base station 2 after the period T. When the terminal 12 does not normally receive the packet data, the terminal 12 transmits NACK.

As shown in FIG. 2B, in the mobile communication system 1, when the number of users M can be set as a maximum number of users allocated to a certain packet transmission period, plural users may be allocated to an identical packet transmission period t [s].

For example, when packet data is transmitted to the users 1 to 3 in a certain packet transmission period, response data responding to the respective packet data are transmitted from the respective terminals after the period T.

Figure 3:
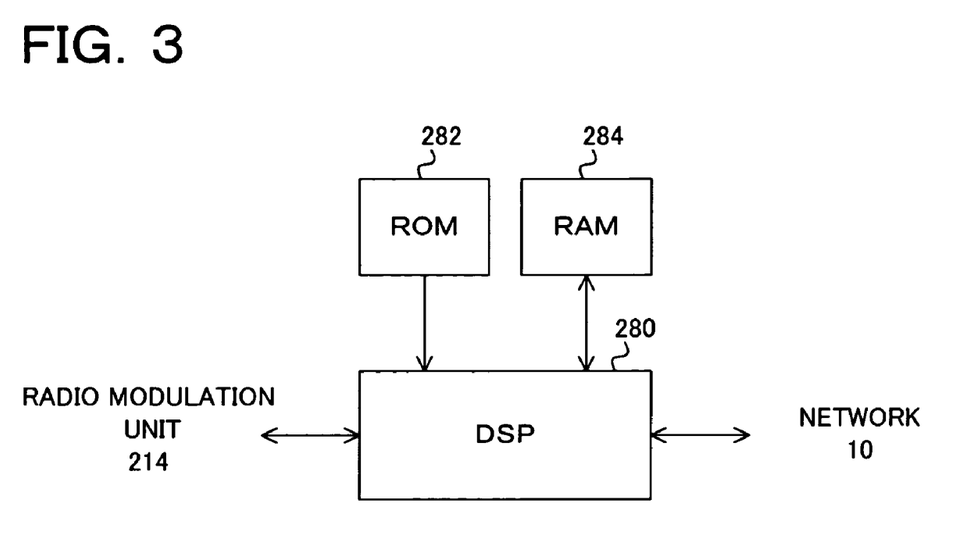
FIG. 3 is a diagram showing a hardware configuration included in a base station.

FIG. 3 is a diagram showing a hardware configuration included in the base station 2 according to the invention.

As shown in FIG. 3, the base station 2 includes a DSP 280, a ROM 282, and a RAM 284.

Functions of the base station 2 (described later using FIGS. 4 to 7) are properly executed by software executed by the DSP 280 and dedicated hardware or any one of the software and the hardware.

The software is realized as software modules independent from one another. The software can be properly added or deleted as required and can be started at arbitrary timing by an OS (not shown) or the like.

The DSP 280 executes software stored in the ROM 282 or the RAM 284.

The DSP 280 has a communication function for communicating via the network 10 and an input/output function for input to and output from other hardware configurations included in the base station 2.

The ROM 282 stores the software executed by the DSP 280.

The RAM 284 stores software and data and the like temporarily held.

Figure 4:
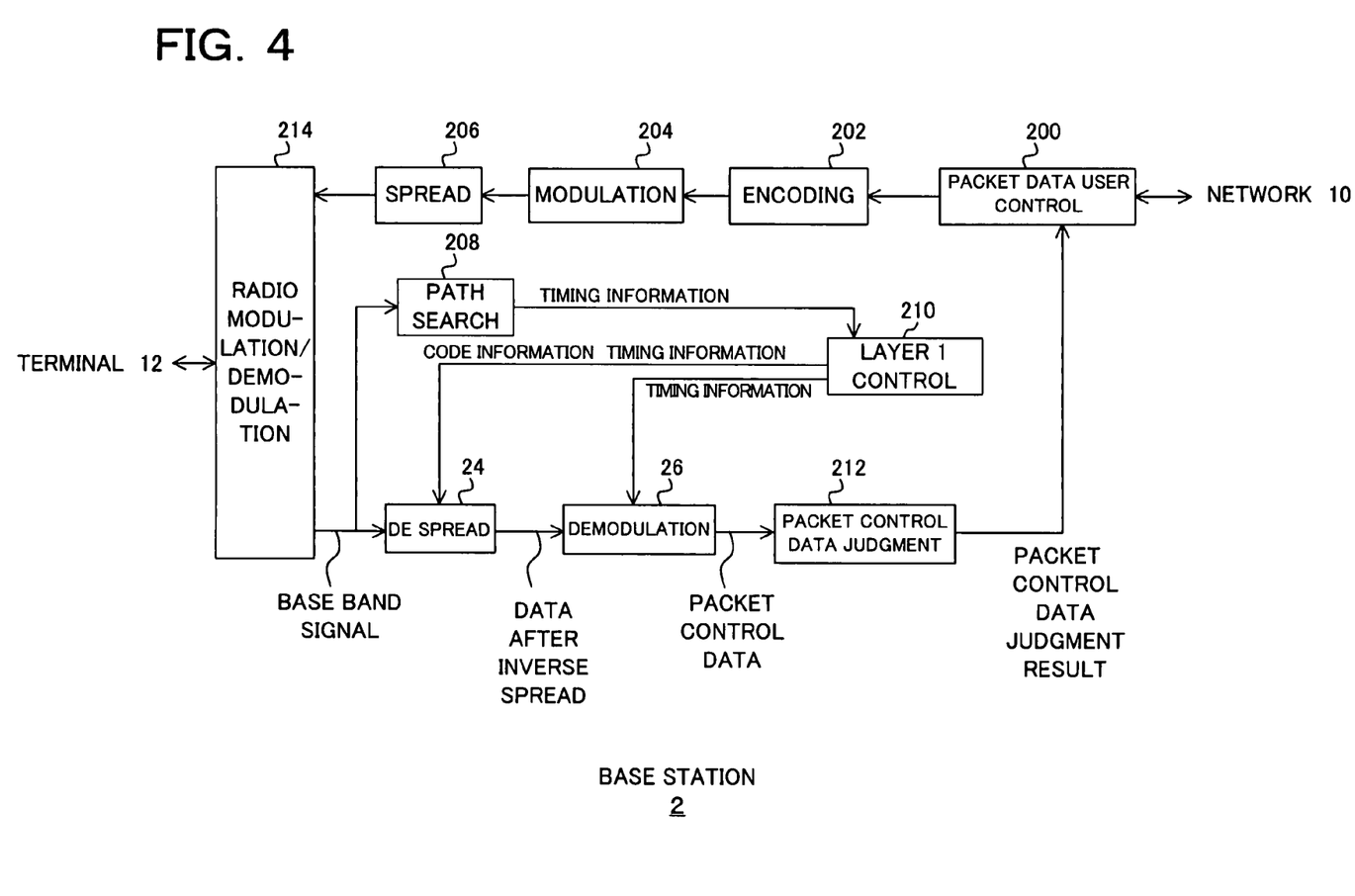
FIG. 4 is a block diagram showing a constitution of a base station 2.

FIG. 4 is a block diagram showing a constitution of the base station 2 according to the embodiment of the invention.

As shown in FIG. 4, the base station 2 includes a packet data user control unit 200, an encoding unit 202, a modulation unit 204, a spread unit 206, a path search unit 208, a layer 1 control unit 210, an de spread unit 24, a demodulation unit 26, a packet control data judging unit 212, and a radio modulation/demodulation unit 214.

The packet data user control unit 200, the layer 1 control unit 210, and the packet control data judging unit 212 are stored in the ROM 282 (FIG. 3) and realized as software executed by the DSP 280.

The de spread unit 24 and the demodulation unit 26 are properly executed by the software executed by the DSP 280 and dedicated hardware or any one of the software and the hardware.

The base station 2 controls packet data for a user to transmit the packet data and detects response data responding to this packet data from a reception signal.

The packet data user control unit 200 determines a transmission order of packet data.

The packet data user control unit 200 outputs packet data, which is inputted from the network 10 and transmitted to an arbitrary user making connection to the base station 2, and user information (an encoding system, a modulation system, the number of codes per user, etc. in transmitting the packet data) concerning this user to the encoding unit 202.

The packet data user control unit 200 determines user information according to a packet control data judgment result and the like received from the packet control data judging uni212 described later.

The encoding unit 202 encodes the packet data on the basis of the user information received and outputs the packet data to the modulation unit 204.

The modulation unit 204 modulates the packet data after the encoding on the basis of this user information and outputs the packet data to the spread unit 206.

The spread unit 206 spreads the packet data after the modulation on the basis of this user information and outputs the packet data to the radio modulation/demodulation unit 214.

The radio modulation/demodulation unit 214 converts the packet data after the spread into a radio signal in the radio frequency band and sends the packet data to the terminal 12.

The radio modulation/demodulation unit 214 receives the signal in the radio frequency band transmitted from the terminal 12, converts the signal into a base band signal, and outputs the base band signal to the path search unit 208 and the de spread unit 24.

The path search unit 208 searches through paths of all users making connection to the base station 2, detects timing of the paths, and outputs this path timing to the layer 1 control unit 210 as timing information.

The layer 1 control unit 210 sets this timing information and uplink code information (unique for the users) of all the users making connection to the base station 2 in the de spread unit 24 and further outputs this timing information to the demodulation unit 26.

The de spread unit 24 performs de spread for uplink signals of the respective users and outputs data after the de spread to the demodulation unit 26.

The demodulation unit 26 applies synchronous detection and RAKE combination to the data after the de spread on the basis of the timing information of the respective users and outputs the uplink packet control data (ACK/NACK information) transmitted from the respective users to the packet control data judging unit 212.

The packet control data judging unit 212 judges the ACK/NACK information responding to the packet data transmitted to an arbitrary user and outputs a judgment result to the packet data user control unit 200.

Figure 5:
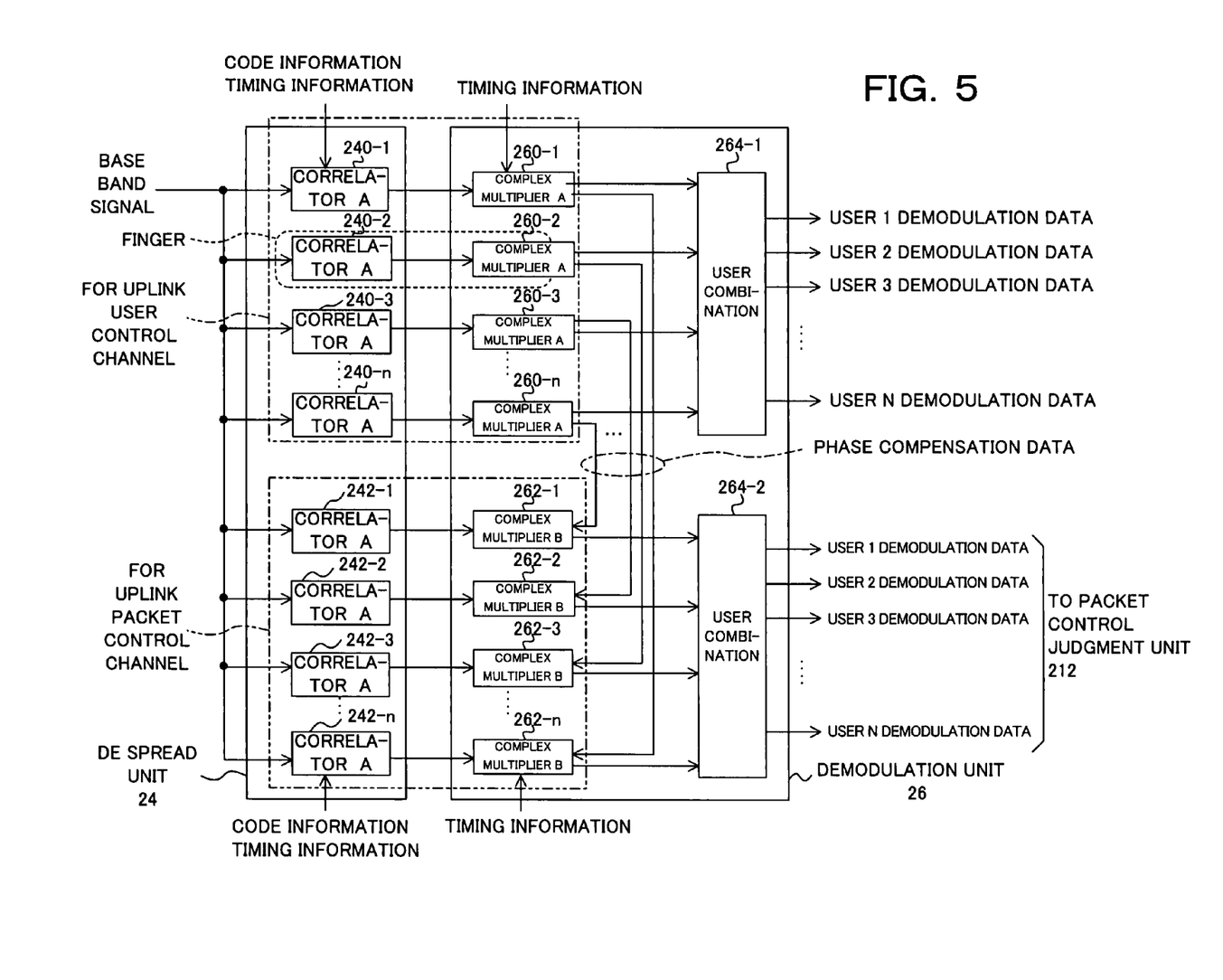
FIG. 5 is a diagram showing, in detail, constitutions of an de spread unit 24 and a demodulation unit 26 shown in FIG. 4.

FIG. 5 is a diagram showing, in detail, constitutions of the de-spread unit 24 and the demodulation unit 26 shown in FIG. 4.

As shown in FIG. 5, the de spread unit 24 includes first correlators (correlators A) 240-1 to 240-n and second correlators (correlators B) 242-1 to 242-n. The demodulation unit 26 includes first complex multipliers (complex multipliers A) 260-1 to 260-n, second complex multipliers (complex multipliers B) 262-1 to 262-n, a first user combination unit 264-1, and a second user combination unit 264-2.

A combination of one correlator and one complex multiplier corresponding to this correlator is referred to as a finger.

An uplink user control channel mainly transmits control information such as a pilot symbol used for synchronous detection.

A combination (a finger; phase fluctuation detecting means) of the first correlator 240 and the first complex multiplier 260 handles the uplink user control channel. The uplink user control channel is provided independently for respective users who can be covered by the base station.

For example, assuming that the number of fingers per one user is eight, n combinations of the first correlator 240 and the first complex multiplier 260 are provided (n=number of fingers 8×maximum number of users covered by the base station N).

The uplink packet control channel transmits ACK/NACK information responding to downlink packet data transmitted to the users.

A combination (a finger: data detecting means) of the second correlator 242 and the second complex multiplier 262 handles the uplink packet control channel. The uplink control channel is also provided independently for respective users who can be covered by the base station.

For example, n combinations of the second correlator 242 and the second complex multiplier 262 are provided as well.

The finger for the uplink user control channel and the finger for the uplink packet control channel correspond in a one-to-one relation for an identical user and an identical path.

This correspondence relation does not change until call between the base station and the arbitrary terminal 12 is released.

For example, a combination of the first correlators 240-1 to 240-8 and the first complex multipliers 260-1 to 260-8 are fixedly allocated to the uplink user control channel of the terminal 12-1. A combination of the second correlators 242-(n-7) to 242-n and the second complex multipliers 262-(n-7) to 262-n is fixedly allocated to the uplink packet control channel of the terminal 12-1.

When paths (eight for one user; the number of fingers) are searched through by the path search unit 208 (FIG. 4), the respective paths of the users are inputted to the fingers of each of the uplink user control channel and the uplink packet control channel as timing information.

The first correlator 240 (FIG. 5) detects correlation between code information of the users and base band signals and outputs the correlation to the first complex multiplier 260.

The first complex multiplier 260 subjects this detected data and the pilot symbol for synchronous detection to complex multiplication, detects a phase fluctuation in the correlation detected (a channel estimation vector; phase compensation data), and outputs the phase fluctuation to the second complex multiplier 262.

The pilot symbol is a known symbol in each of the base station 2 and the terminal 12 and is inserted between data symbols.

On the other hand, in the same manner as the first correlator 240, the second correlator 242 detects correlation between code information of the users and base band signals and outputs the correlation to the second complex multiplier 262.

The second complex multiplier 262 subjects this detected data and the phase compensation data detected by the first complex multiplier 260 to complex multiplication, compensates for the detected phase fluctuation, and outputs data concerning the paths of the users to the second user combination unit 264-2.

The first user combination unit 264-1 and the second user combination unit 264-2 subject plural paths to RAKE combination for the respective users.

The second user combination unit 264-2 outputs the uplink packet control data of the respective users to the packet control data judging unit 212.

The base station 2 operates as explained above. As shown in FIGS. 2A and 2B, the packet control data is data for transmitting ACK/NACK that is returned when the period T [s] elapses after the downlink packet data is transmitted. Thus, this response signal changes to a burst signal in the respective users.

In other words, since the terminal 12 does not transmit a signal steadily, there is a period in which the base station 2 does not receive a signal from a certain user (a no signal section).

In the mobile communication system 1, a maximum number of users allocated to the packet transmission period t [s] is set as M (M<maximum number of users covered by the base station N). Thus, the base station 2 does not receive signals from users, the number of whom exceeds this maximum number M, in an identical period.

In other words, a correlator and a complex multiplier may be allocated even in the no signal section.

When the correlator and the complex multiplier are allocated in the no signal section, the correlator and the complex multiplier may perform de spread processing and demodulation processing regardless of the no signal section and detect ACK/NACK information.

Second Embodiment

A base station 3 constituted to solve a deficiency, which can occur in the base station 2, will be hereinafter explained.

Figure 6:
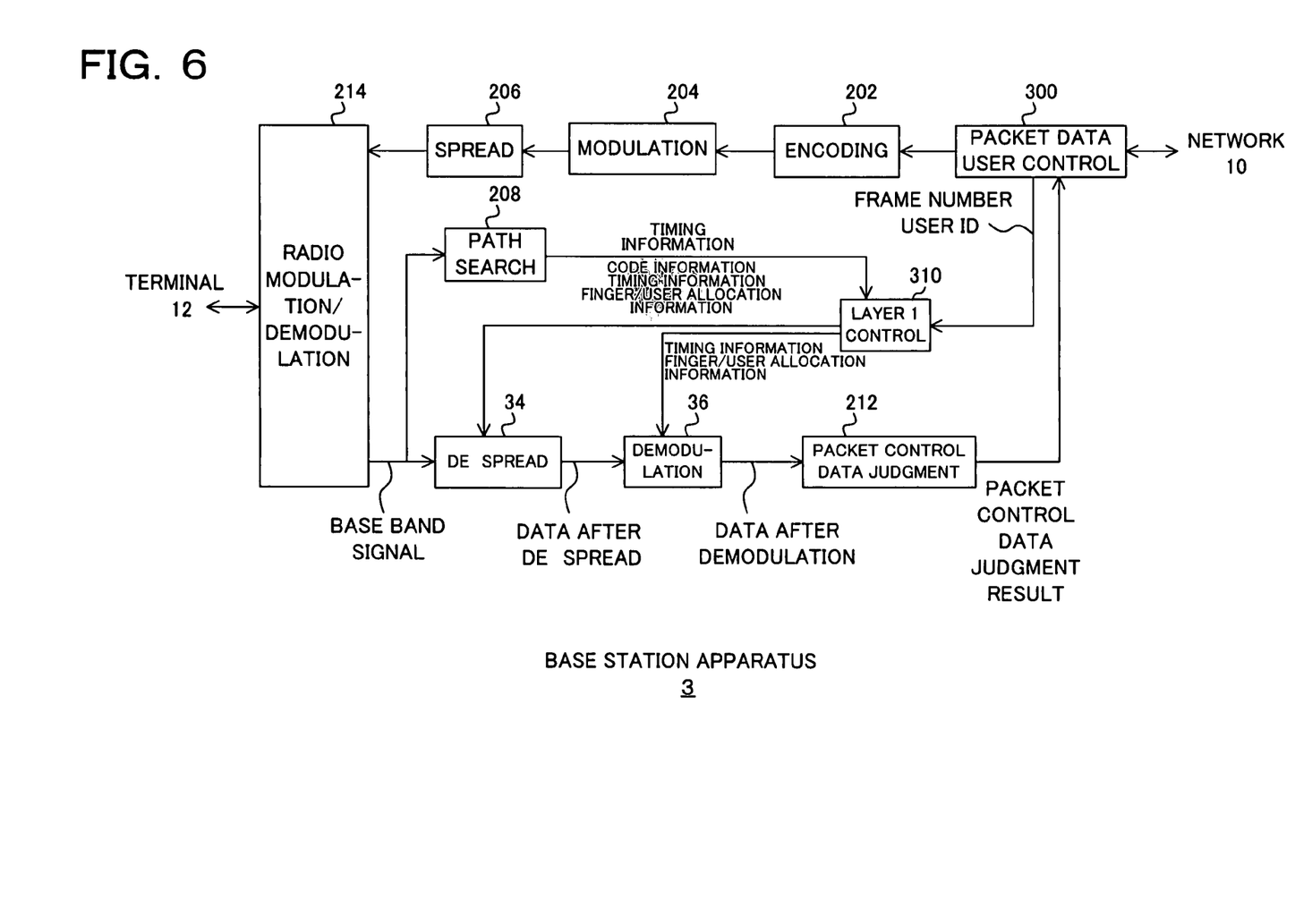
FIG. 6 is a block diagram showing a constitution of a base station 3.

FIG. 6 is a block diagram showing a constitution of the base station 3 according to an embodiment of the invention.

As shown in FIG. 6, the base station 3 includes a packet data user control unit 300, the encoding unit 202, the modulation unit 204, the spread unit 206, the path search unit 208, a layer 1 control unit 310, an de spread unit 34, a demodulation unit 36, the packet control data judging unit 212, and the radio modulation/demodulation unit 214.

The base station 3 controls, using these components, packet data for users to transmit the packet data and detects ACK/NACK information (response data) responding to this packet data from a reception signal.

Among the components shown in FIG. 6, those substantially identical with the components shown in FIG. 4 are denoted by the identical reference numerals.

The packet data user control unit 300 determines a transmission order of packet data using a channel exclusively used for packet communication and outputs packet data, which is inputted from the network 10 and transmitted to an arbitrary user making connection to the base station 3, and user information (an encoding system, a modulation system, the number of codes per user, etc.) concerning this user to the encoding unit 202.

The packet data user control unit 300 determines user information according to a packet control data judgment result and the like received from the packet control data judging unit 212.

The packet data user control unit 300 receives ACK/NACK information (the packet control data judgment result outputted from the packet control data judging unit 212) from a user and controls data transmission concerning this user.

For example, the packet data user control unit 300 performs control for not performing next data transmission to the terminal 12-1 until ACK/NACK information responding to data transmitted to the terminal 12-1 in a certain packet transmission period is received.

The packet data user control unit 300 performs retransmission control.

For example, when the packet data user control unit 300 receives ACK information from the terminal 12-1, the packet data user control unit 300 transmits new data in the next data transmission to the terminal 12-1. On the other hand, when the packet data user control unit 300 receives NACK information from the terminal 12-1, the packet data user control unit 300 retransmits data transmitted last time in the next data transmission to the terminal 12-1.

The packet data user control unit 300 determines a data transmission order in accordance with a predetermined data transmission order determination algorithm.

The data transmission order determination algorithm determines a transmission order on the basis of quality information such as SIR and BLER and ACK/NACK information.

For example, when new data transmitted to the terminal 12-1 and retransmission data transmitted to the terminal 12-2 overlap in an identical packet transmission period, the packet data user control unit 300 determines a transmission order on the basis of this algorithm.

Moreover, the packet data user control unit 300 outputs a user identifier (ID) for uniquely identifying a user, to whom data is determined to be transmitted in an arbitrary frame (packet transmission period; a predetermined period), and a frame number for uniquely identifying this frame to the layer 1 control unit 310.

In this way, the packet data user control unit 300 controls a packet data transmission order and notifies the layer 1 control unit 310 of the frame number and the user ID transmitted in the packet transmission period identified by this frame number.

The layer 1 control unit 310 manages timing information (path timing of all the users) inputted from the path search unit 208, uplink code information of all the users, and the frame number and the user ID notified from the packet data user control unit 300 and controls de spread and demodulation.

Specifically, the layer 1 control unit 310 specifies, on the basis of the user ID and the frame number inputted from the packet data user control unit 300, a packet transmission period after the predetermined period T [s] elapses from the packet transmission period identified by this frame number. The layer 1 control unit 310 associates a frame number for identifying this packet transmission period and a user who transmits packet control data through a packet control channel in this frame.

The layer 1 control unit 310 stores the user ID, the frame number, and related information, which is obtained on the basis of the user ID and the frame number, in the RAM 284 (FIG. 3).

In this way, the layer 1 control unit 310 specifies a user to whom data can be transmitted after the period T.

Moreover, the layer 1 control unit 310 creates finger/user allocation information indicating to which user a combination (a finger) of the second correlator 242 and the second complex multiplier 262 for packet control data are allocated.

The layer 1 control unit 310 outputs the timing information, the code information, and the finger/user allocation information to the de spread unit 34 (described later with reference to FIG. 7) and allocates respective effective paths of all the users to the first correlator 240 for a user control channel.

Figure 7:
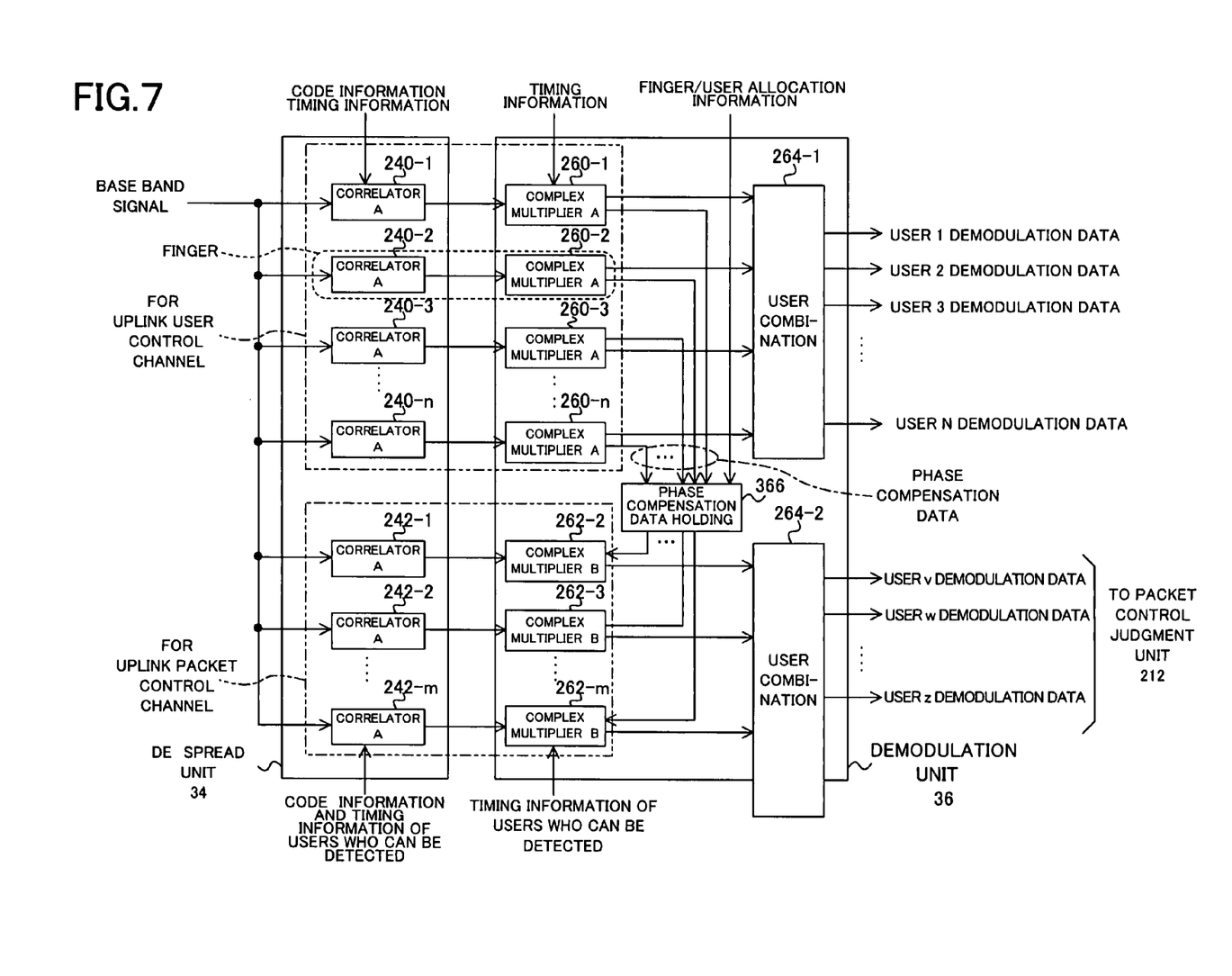
FIG. 7 is a diagram showing, in detail, constitutions of an de spread unit 34 and a demodulation unit 36 shown in FIG. 6.

The layer 1 control unit 310 further utilizes a relation between frame numbers and packet control data transmission users associated in advance (finger/user allocation information) to allocate respective effective paths of all the transmission users in this frame to the second correlator 242 for a packet control channel.

The layer 1 control unit 310 outputs the timing information and the finger/user allocation information to the demodulation unit 36 (described later with reference to FIG. 7) and allocates respective effective paths of all the users to the first complex multiplier 260 for a user control channel.

The layer 1 control unit 310 further utilizes the relation between frame numbers and packet control data transmission users associated in advance to allocate respective effective paths of all the transmission users in this frame to the second complex multiplier 262 for a packet control channel.

The finger/user allocation information is used such that phase compensation data generated in the demodulation unit 36 is appropriately used for synchronous detection.

In this way, the layer 1 control unit 310 sets the code information, the timing information, and the finger/user allocation information such that a correlator, a complex multiplier, and phase compensation data are connected with an identical user and an identical path and controls de spread processing and demodulation processing.

FIG. 7 is a diagram showing, in detail, constitutions of the de spread unit 34 and the demodulation unit 36 shown in FIG. 6.

As shown in FIG. 7, the de spread unit 34 includes the first correlators (correlators A) 240-1 to 240-n and second correlators (correlators B) 242-1 to 242-m. The demodulation unit 36 includes the first complex multipliers (the complex multipliers A) 260-1 to 260-n, second complex multipliers (complex multipliers B) 262-1 to 262-m, the first user combination unit 264-1, the second user combination unit 264-2, and a phase compensation data holding unit 366 (phase fluctuation supplying means).

Among the components shown in FIG. 7, those substantially identical with the components shown in FIG. 5 are denoted by the identical reference numerals.

Whereas n combinations (fingers; phase fluctuation detecting means) of the first correlator 240 and the first complex multiplier 260 (n=number of fingers 8×maximum number of users covered by the base station N) are provided, combinations (data detecting means) of the second correlator 242 and the second complex multiplier 262 are provided at least by a number of users to whom data can be transmitted in a certain frame.

For example, m combinations of the second correlator 242 and the second complex multiplier 262 are provided (m=number of fingers 8×maximum number of transmission users of one frame M; M<N).

A finger for an uplink user control channel and a finger for an uplink packet control channel are associated by finger/user allocation information inputted from the layer 1 control unit 310.

In other words, this corresponding relation is effective only in this frame.

The first correlator 240 detects correlation between code information of the users and base band signals and outputs the correlation to the first complex multiplier 260.

The first complex multiplier 260 subjects this detected data and the pilot symbol for synchronous detection to complex multiplication, detects phase compensation data, and outputs the phase compensation data to the phase compensation data holding unit 366.

The phase compensation data holding unit 366 holds phase compensation data inputted from the respective first complex multipliers 260, inputs the finger/user allocation information outputted from the layer 1 control unit 310, and outputs the phase compensation data to the second complex multiplier 262 in accordance with this finger/user allocation information.

Specifically, the phase compensation data holding unit 366 judges, on the basis of the finger/user allocation information, to which fingers the respective phase compensation data held correspond and outputs the respective phase compensation data to the fingers corresponding thereto.

The phase compensation data holding unit 366 stores the detected phase compensation data in the RAM 284 (FIG. 3).

The second correlator 242 detects correlation between code information of users, who can transmit data in a certain frame and are allocated to the frame, and base band signals and outputs the correlation to the second complex multiplier 262.

The second complex multiplier 262 subjects this data detected and the phase compensation data outputted from the phase compensation data holding unit 366 to complex multiplication to perform synchronous detection and outputs data concerning paths of the users to the second user combination unit 264-2.

The first user combination unit 264-1 and the second user combination unit 264-2 subject plural paths to RAKE combination for the respective users.

The second user combination unit 264-2 outputs uplink packet control data of the respective users, who can transmit data in a certain frame, to the packet control data judging unit 212.

Packet data transmission processing by the base station 3

Figure 8:
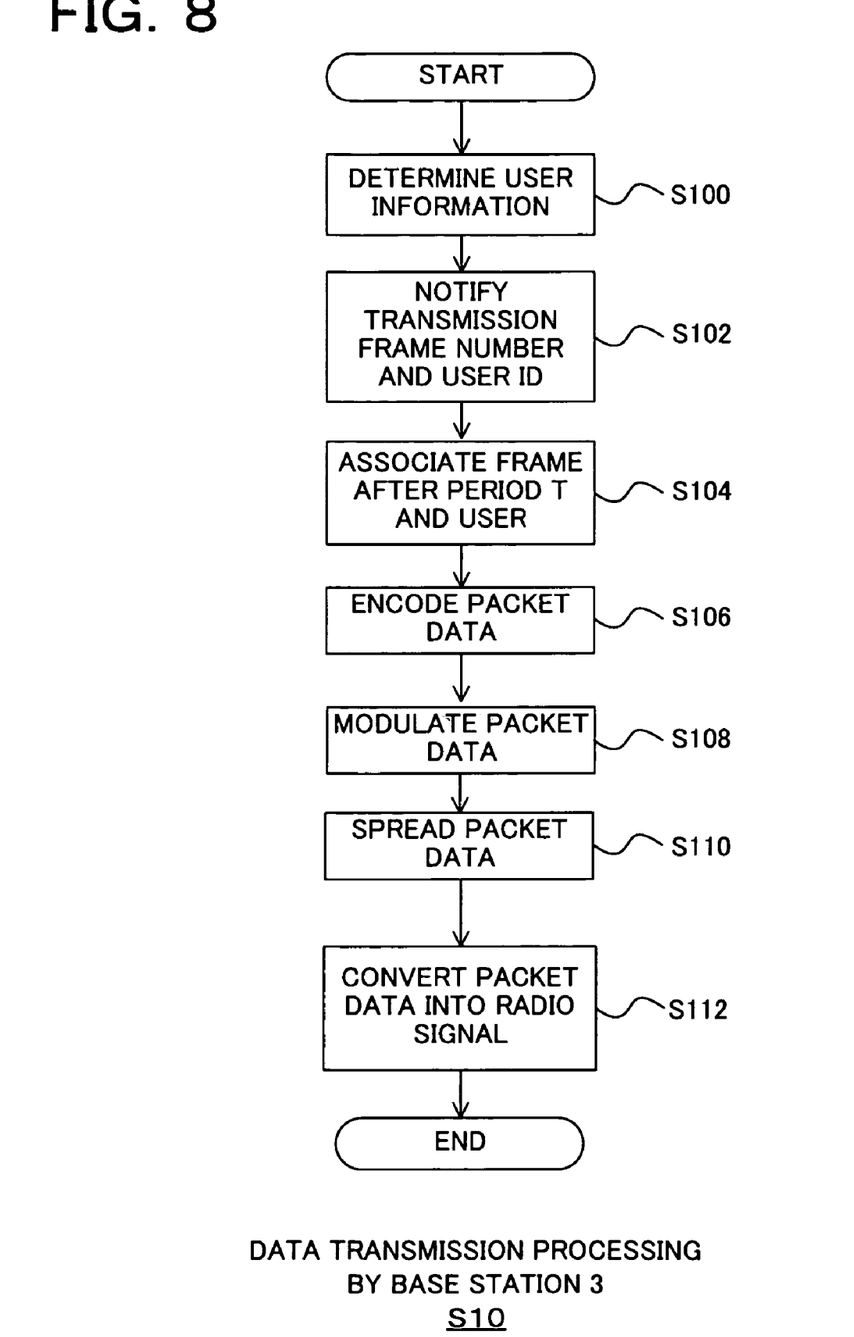
FIG. 8 is a diagram showing a flowchart of packet data transmission processing by the base station 3.

FIG. 8 is a diagram showing a flowchart of packet data transmission processing by the base station 3.

As shown in FIG. 8, in step 100 (S100), the packet data user control unit 300 determines a data transmission order in accordance with a predetermined data transmission order determination algorithm in a certain frame (a packet transmission period) and selects and determines user information (an encoding system, a modulation system, the number of codes per user, etc.) in transmitting data.

The packet data user control unit 300 outputs the packet data and the user information to the encoding unit 202.

In step 102 (S102), the packet data user control unit 300 notifies the layer 1 control unit 310 of a frame number of this frame and a user ID transmitted in this frame.

In step 104 (S104), the layer 1 control unit 310 specifies a frame number of a frame after the predetermined period T elapses from this frame on the basis of the frame number notified and associates, using the user ID notified, this specified frame with a user who transmits packet control data to this frame through the packet control channel.

In step 106 (S106), the encoding unit 202 encodes packet data on the basis of the user information determined and outputs the packet data to the modulation unit 204.

In step 108 (S108), the modulation unit 204 modulates the packet data on the basis of this user information and outputs the packet data to the spread unit 206.

In step 110 (S110), the spread unit 206 spreads the packet data on the basis of this user information and outputs the packet data to the radio modulation/demodulation unit 214.

In step 112 (S112), the radio modulation/demodulation unit 214 converts the packet data into a radio signal and sends the radio signal to the terminal 12.

In this way, the base station 3 specifies a user who transmits packet control data through the packet control channel in a frame after the period T elapses from a frame in which packet data is transmitted and transmits the packet data to the user.

Packet data reception processing by the base station 3

Figure 9:
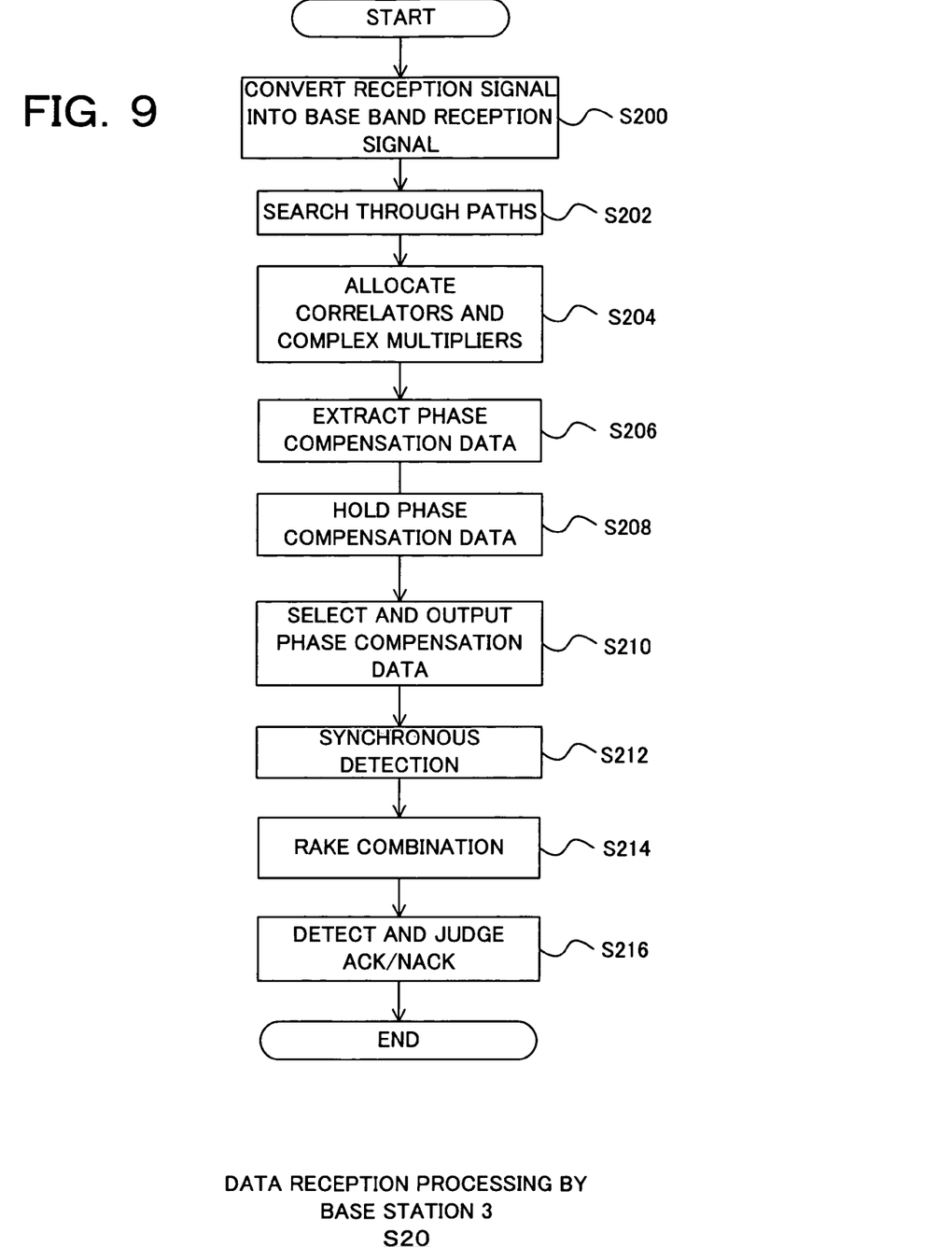
FIG. 9 is a diagram showing a flowchart of packet data reception processing by the base station 3.

FIG. 9 is a diagram showing a flowchart of packet data reception processing by the base station 3.

As shown in FIG. 9, in step 200 (S200), the radio modulation/demodulation unit 214 converts a reception signal from the terminal 12 into a base band signal and outputs the base band signal to the path search unit 208 and the de spread unit 34.

In step 202 (S202), the path search unit 208 searches through paths of all users, detects timing of the paths (timing information), and outputs the timing information to the layer 1 control unit 310.

In step 204 (S204), the layer 1 control unit 310 allocates, on the basis of the timing information, the respective paths of the users to a combination (a finger) of the first correlator 240 and the first complex multiplier 260.

The layer 1 control unit 310 allocates, on the basis of association of frame numbers and user IDs determined in advance, the respective paths of users, who transmit packet control data to the frame, to a combination (a finger) of the second correlator 242 and the second complex multiplier 262.

In step 206 (S206), the respective first correlators 240 detect correlation between code information of the users and base band signals and output the correlation to the respective first complex multipliers 260.

The respective complex multipliers 260 subject this detected data and a pilot symbol to complex multiplication, detect phase compensation data, and output the phase compensation data to the phase compensation data holding unit 366 and the first user combination unit 264-1.

In step 208 (S208), the phase compensation data holding unit 366 holds the respective phase compensation data outputted.

In step 210 (S210), the layer 1 control unit 310 outputs finger/user allocation information to the phase compensation data holding unit 366.

The phase compensation data holding unit 366 specifies, on the basis of this finger/user allocation information, to which fingers users who transmit data in the frame are allocated, selects respective phase compensation data identified by the users and paths, and outputs the phase compensation data to a finger corresponding to the phase compensation data.

In step 212 (S212), the respective second phase correlators 242 detect correlation between code information of the users who transmit data (can be detected) and base band signals and output the correlation to the respective second complex multipliers 262.

The respective second complex multipliers 262 subject the data detected by the respective second phase detectors 242 and phase compensation data corresponding thereto to complex multiplication to perform synchronous detection and output data concerning one path of a certain user to the second user combination unit 264-2.

In step 214 (S214), the first user combination unit 264-1 and the second user combination unit 264-2 subject plural paths to RAKE combination for the respective users.

The second user combination unit 264-2 outputs uplink packet control data of the respective users after the combination to the packet control data judging unit 212.

In step 216 (S216), the packet control data judging unit 212 detects and judges ACK/NACK information and outputs the ACK/NACK information to the packet data user control unit 300.

In this way, the base station 3 detects ACK/NACK information responding to packet data transmitted to users in a certain frame from a response signal and judges the ACK/NACK information.

As explained above, the base station 3 has the second correlators 242 and the second complex multipliers 262 (fingers) at least by the number of users who can transmit data in an identical packet transmission period, allocates the users who can transmit data, to these fingers, and detects ACK/NACK information from the users. Thus, it is possible to reduce the number of these pieces of hardware.

The base station 3 allocates only the users who can transmit data, to the second correlators 242 and the second complex multipliers 262 and detects ACK/NACK information. Thus, only when ACK/NACK information is actually present, it is possible to judge the ACK/NACK information and it is possible to prevent misdetection of ACK/NACK information.

What is claimed is:

1. A base station apparatus that transmits data to and receives data from a first number of communication terminals, transmits data to a second number of communication terminals after a packet transmission period elapses, the second number being smaller than the first number, and detects response data which indicates whether the respective second number of communication terminals receive data from signals transmitted from the respective second number of communication terminals, the base station apparatus comprising:
   a packet data user control processor that outputs a user identifier for uniquely identifying a user, to whom data is determined to be transmitted in the packet transmission period and a frame number for uniquely identifying the packet transmission period to a layer 1 control processor;
   the layer 1 control processor that, based on a relation between the frame number and the user associated in advance, allocates each of paths of all users who can receive packet control data to control transmission of packets to a first number of fingers and each of paths of users who receive the packet control data in the frame to a second number of fingers such that a correlator and a complex multiplier are connected with an identical user and an identical path;
   the first number of fingers detecting phase fluctuations for the response data from the respective first number of communication terminals;
   a phase fluctuation supplying processor that supplies the respective phase fluctuations detected by the first number of fingers to the respective second number of fingers; and
   the second number of fingers that, based on the phase fluctuations supplied by the phase fluctuation supplying processor, compensate for phase fluctuations in the response data from the second number of communication terminals corresponding to the phase fluctuations;
   wherein the first number indicates the number of users covered by one base station as the maximum, and the second number indicates the number of users that can communicate with the base station in the packet transmission period as the maximum.

2. A base station apparatus according to claim 1, wherein the first number of fingers includes:
   a first number of correlators that detect correlation between code data which indicates the number of codes per user and uniquely identifies the user and the signals transmitted from the respective second number of communication terminals; and
   a first number of complex multipliers that subject the correlation detected by the first number of correlators and a pilot symbol for synchronous detection, and
   the second number of the fingers includes:
   a second number of correlators that detect correlation between the code data and the signals transmitted from the respective second number of communication terminals; and
   a second number of complex multipliers that subject the correlation detected by the second number of correlators and the phase fluctuations supplied by a phase fluctuation detecting processor.

3. A base station apparatus according to claim 1, wherein the phase fluctuation supplying processor holds the respective phase fluctuations detected by the first number of fingers and supplies the phase fluctuations held to the second number of fingers according to the predetermined period and the second number of communication terminals to which the data is transmitted during the predetermined period.

4. The base station apparatus according to claim 1, further comprising:
   a packet data user control unit which outputs the frame number and the user identifier to the layer 1 control processor.

5. The base station apparatus according to claim 4, wherein the layer 1 control processor specifies, on the basis of the frame number and the user identifier inputted from the packet data user control processor, the packet transmission period after the packet transmission period identified by the frame number elapses.

6. The base station apparatus according to claim 5, wherein the layer 1 control processor associates the specified packet transmission period with the user identifier and stores the associated period and the user identifier.

7. The base station apparatus according to claim 4, wherein the layer 1 control processor specifies the terminal to which the response data can be transmitted after the specified packet transmission period elapses.

8. The base station apparatus according to claim 4, wherein the layer 1 control processor creates a finger/user allocation information indicating to which user each of the second number of fingers is allocated.

9. The base station apparatus according to claim 8, wherein the layer 1 control processor outputs the finger/user allocation information to the phase fluctuation supplying processor.

10. The base station apparatus according to claim 9, wherein
    the phase fluctuation supplying processor further correlates the finger/user allocation information with each of outputs from the first number of fingers and supplies each of the outputs from the first number of fingers to each of the second number of fingers;
    the data detecting correlating processor correlates each of outputs from the second number of fingers, after the specified packet transmission period elapses, and defines a data detecting correlation output; and
    the base station compensates for phase fluctuations in response data from the respective second number of communication terminals at least based on the data detection correlation output.

* * * * *